US012435296B2

(12) United States Patent
Jha et al.

(10) Patent No.: US 12,435,296 B2
(45) Date of Patent: Oct. 7, 2025

(54) SOLID FABRIC CARE COMPOSITIONS AND METHODS FOR THE SAME

(71) Applicant: Colgate-Palmolive Company, New York, NY (US)

(72) Inventors: Brajesh Jha, Midlothian, VA (US); Evelyn Mohammed, Hillsborough, NJ (US); Vivian Mui, Middlesex, NJ (US); Raul Arellano Maldonado, D. F. (MX); Mayur Barai, New Brunswick, NJ (US)

(73) Assignee: Colgate-Palmolive Company, New York, NY (US)

( * ) Notice: Subject to any disclaimer, the term of this patent is extended or adjusted under 35 U.S.C. 154(b) by 740 days.

(21) Appl. No.: 17/594,642

(22) PCT Filed: May 6, 2019

(86) PCT No.: PCT/US2019/030812

§ 371 (c)(1),
(2) Date: Oct. 25, 2021

(87) PCT Pub. No.: WO2020/226614

PCT Pub. Date: Nov. 12, 2020

(65) Prior Publication Data

US 2022/0195336 A1 Jun. 23, 2022

(51) Int. Cl.

| | |
|---|---|
| ***C11D 3/00*** | (2006.01) |
| ***C11D 1/72*** | (2006.01) |
| ***C11D 3/22*** | (2006.01) |
| ***C11D 3/37*** | (2006.01) |
| ***C11D 3/50*** | (2006.01) |
| ***C11D 11/00*** | (2006.01) |

(52) U.S. Cl.

CPC .............. *C11D 3/001* (2013.01); *C11D 1/721* (2013.01); *C11D 3/222* (2013.01); *C11D 3/3769* (2013.01); *C11D 3/505* (2013.01); *C11D 2111/12* (2024.01)

(58) Field of Classification Search

CPC ... C11D 3/001; C11D 11/0017; C11D 3/3769; C11D 3/505

See application file for complete search history.

(56) References Cited

U.S. PATENT DOCUMENTS 9,138,384 B2 9/2015 Boyd et al.
9,347,022 B1 5/2016 Frentzel et al.
2004/0142828 A1* 7/2004 Popplewell .............. A61K 8/11 510/101
2006/0018968 A1* 1/2006 Melbouci ............... D21H 19/54 424/701
2009/0099055 A1* 4/2009 Mayer ...................... C11D 9/26 510/276
2011/0034365 A1* 2/2011 Lant ....................... C11D 3/225 510/320
2011/0097369 A1* 4/2011 Sunder ................... C11D 3/505 510/513
2011/0269658 A1* 11/2011 Dihora ..................... A61Q 5/02 510/130
2014/0044761 A1 2/2014 Lei et al.
2016/0083438 A9 3/2016 Doolan et al.
2016/0244698 A1* 8/2016 Schubert ............ C11D 3/38609
2017/0009184 A1* 1/2017 Schubert .............. C11D 3/2093
2017/0166846 A1 6/2017 Boutique et al.
2017/0218310 A1 8/2017 Schramm et al.
2018/0051235 A1* 2/2018 Schubert ................ C11D 3/001
2022/0195336 A1* 6/2022 Jha ..................... C11D 17/0039
2022/0401340 A1* 12/2022 Jha ....................... A61K 8/0254

FOREIGN PATENT DOCUMENTS

CN 1497009 5/2004
CN 102858940 1/2013
CN 104560398 4/2015
EP 1407754 4/2004
EP 3181680 6/2017
EP 3181680 A1 * 6/2017 ......... C11D 11/0017
WO 2018172514 9/2018
WO WO-2018172514 A1 * 9/2018 .............. B01J 13/14

OTHER PUBLICATIONS

International Search Report and the Written Opinion of the International Searching Authority issued in International Application PCT/US2019/030812 mailed Jan. 23, 2020.

Wei Chao et al., Pharmaceutics 2nd Edition, p. 230, Aug. 2012, Henan Science and Technology Press.

* cited by examiner

*Primary Examiner* — Liam J Heincer
*Assistant Examiner* — M. Reza Asdjodi

(57) ABSTRACT

Fabric care compositions and methods for preparing the fabric care composition and delivering increased fragrance intensity to a fabric are provided. The fabric care composition may include a water hydratable solid and capsules dispersed in the water hydratable solid. The water hydratable solid may include one or more water soluble polymers, such as a hydroxyalkyl cellulose polymer, one or more cationic polymers, such as a polyquat, and one or more starches. The capsules may include a fragrance encapsulated therein.

17 Claims, No Drawings

SOLID FABRIC CARE COMPOSITIONS AND METHODS FOR THE SAME

BACKGROUND

Conventional fabric care compositions, such as fabric softeners or detergents, may often include fragrances or perfumes that make the treated fabrics or fibers thereof more aesthetically pleasing to consumers. The fragrances or perfumes may often be delivered as a liquid, such as in a fabric softener, through the washing and/or rinsing of a laundering cycle or be present in solid fabric care compositions used in the drying cycle, usually incorporated onto woven substrates placed in the dryer. The fabric care compositions containing the fragrances should not only smell pleasant, and in that way add to the purchase perception, but also impart long lasting fragrance to the fibers or fabrics treated therewith.

A common practice for delivering the fragrances is the admixing of the free fragrances directly into the product (e.g., fabric softener, detergent, or the like). However, there are several drawbacks to this simple approach. For example, the fragrances are often volatile, thereby resulting in fragrance loss during manufacturing, storage, and/or use. Additionally, many fragrances are also unstable over extended periods of time. Another problem is that the amount of the fragrances transmitted to the fabrics or fibers thereof is often marginal, as much of the fragrances are lost or washed away during washing and drying.

What is needed, then, are new and improved fabric care compositions and methods for delivering fragrances to and from the textiles for prolonged periods of time.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing a fabric care composition including a water hydratable solid and capsules dispersed in the water hydratable solid. The water hydratable solid may include one or more water soluble polymers, one or more cationic polymers, and one or more starches. The capsules may include a fragrance, and the fragrance may be encapsulated in the capsules.

In at least one implementation, the one or more water soluble polymers may include one or more hydroxyalkyl cellulose polymers. The one or more hydroxyalkyl cellulose polymers may include hydroxypropyl methylcellulose.

In at least one implementation, the hydroxyalkyl cellulose polymers may be present in an amount of from about 1 wt % to about 75 wt %, based on a total weight of the fabric care composition In at least one implementation, the one or more starches includes corn starch.

In at least one implementation, the one or more cationic polymers includes a polyquat.

In at least one implementation, the one or more cationic polymers may include one or more of poly(acrylamide-co-diallyldimethylammonium chloride), poly(acrylamide-methacrylamidopropyltrimethyl ammonium chloride), poly(acrylamide-co-N,N-dimethyl aminoethyl acrylate) and its quaternized derivatives, poly(acrylamide-co-N,N-dimethyl aminoethyl methacrylate) and its quaternized derivative, poly(hydroxyethylacrylate-co-dimethyl aminoethyl methacrylate), poly(hydroxpropylacrylate-co-dimethyl aminoethyl methacrylate), poly(hydroxpropylacrylate-co-methacrylamidopropyltrimethyl ammonium chloride), poly(acrylamide-co-diallyldimethylammonium chloride-co-acrylic acid), poly(acrylamide-methacrylamidopropyltrimethyl ammonium chloride-co-acrylic acid), poly(diallyldimethyl ammonium chloride), poly(vinylpyrrolidone-co-dimethylaminoethyl methacrylate), poly(ethyl methacrylate-co-quaternized dimethylaminoethyl methacrylate), poly(ethyl methacrylate-co-oleyl methacrylate-co-diethylaminoethyl methacrylate), poly(diallyldimethylammonium chloride-co-acrylic acid), poly(vinyl pyrrolidone-co-quaternized vinyl imidazole), poly(acrylamide-co-Methacryloamidopropyl-pentamethyl-1,3-propylene-2-ol-ammonium dichloride), or combinations thereof.

In at least one implementation, the one or more cationic polymers includes a copolymer of acrylamide and a quaternium ammonium salt. The quaternium ammonium salt may be diallyldimethylammonium chloride.

In at least one implementation, the fabric care composition is a solid. In one example, the fabric care composition is a solid film.

In at least one implementation, the fabric care composition is free or substantially free of fibers.

The foregoing and/or other aspects and utilities embodied in the present disclosure may be achieved by providing a method for preparing any one of the fabric care compositions disclosed herein. The method may include contacting one or more water soluble polymers, one or more cationic polymers, and the one or more starches with a suitable solvent to prepare a film forming composition. The method may also include dispersing the capsules in the film forming composition. The method may further include removing the solvent from the film forming composition to thereby prepare a solid fabric care composition.

In at least one implementation, removing the solvent from the film forming composition includes casting the film forming composition on a substrate, and evaporating at least a portion of the solvent from the film forming composition. In one example, the solvent is evaporated with heat.

In at least one implementation, the method may include contacting a surfactant with the film forming composition.

The foregoing and/or other aspects and utilities embodied in the present disclosure may be achieved by providing a method for delivering increased fragrance intensity to a fabric. The method may include washing the fabric with any one of the fabric care compositions disclosed herein. The method may also include washing the fabric with any one of the fabric care compositions disclosed herein and a detergent.

In at least one implementation, the method may include depositing capsules of the fabric care composition on the fabric.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

The following description of the preferred embodiment(s) is merely exemplary in nature and is in no way intended to limit the invention, its application, or uses.

The following description of various typical aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any embodiments or implementations disclosed herein. Accordingly, the disclosed range should be construed to have specifically disclosed all the possible subranges as well as individual numerical values within that range. As such, any value within the range may be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Unless otherwise specified, all percentages and amounts expressed herein and elsewhere in the specification should be understood to refer to percentages by weight. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that may be ±0.01% (inclusive), +0.1% (inclusive), +0.5% (inclusive), ±1% (inclusive) of that numeral, ±2% (inclusive) of that numeral, ±3% (inclusive) of that numeral, +5% (inclusive) of that numeral, +10% (inclusive) of that numeral, or ±15% (inclusive) of that numeral. It should further be appreciated that when a numerical range is disclosed herein, any numerical value falling within the range is also specifically disclosed.

As used herein, "free" or "substantially free" of a material may refer to a composition, component, or phase where the material is present in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, or less than 0.0001 weight % based on a total weight of the composition, component, or phase. In some instances, "substantially free" of a material or component may also mean that no amount of that material or component is deliberately incorporated into the composition.

As used herein, an "effective amount" of a material or composition may refer to the amount needed to accomplish an intended purpose; for example, to impart a desired level of fabric care benefit to a substrate or fabric.

All references cited herein are hereby incorporated by reference in their entireties. In the event of a conflict in a definition in the present disclosure and that of a cited reference, the present disclosure controls.

The present inventors have surprisingly and unexpectedly discovered that solid fabric care compositions including fragrance containing capsules dispersed in a water hydratable solid exhibit relatively greater fragrance intensity, delivery, and/or liking when combined with cationic polymers, such as polyquats, as compared to conventional liquid fabric care compositions, as well as solid fabric care compositions, not including the cationic polymers.

Compositions

Compositions disclosed herein may be or include a fabric care product or a fabric care composition thereof. For example, the composition may be a fabric care product including the fabric care composition, or the fiber care composition thereof. The fabric care composition may be or include a solid, such as a water hydratable solid (e.g., a water hydratable film). The fabric care composition may include one or more water soluble polymers, one or more starches, one or more cationic polymers, one or more fragrances, one or more additional components/ingredients, or combinations thereof. As further described herein, the one or more fragrances may be encapsulated in capsules, such as microcapsules.

As used herein, the term or expression "fabric care product" may refer to products for treating fabrics, textiles, garments, or surfaces thereof. Illustrative fabric care products may be or include, but are not limited to, washing agents, such as laundry detergents, fabric conditioning products, softening and/or freshening products that may be in a solid form, or combinations thereof. As used herein, the term or expression "fabric care composition" may refer to compositions for treating or caring for fabrics. Illustrative fabric care compositions may be or include, but are not limited to, compositions for cleaning, treating, or caring for fabrics, compositions for conditioning and/or softening fabrics, compositions for freshening fabrics, compositions for adding and/or providing fragrances to fabrics, including extended release fragrances to fabrics, or combinations thereof.

In at least one implementation, the fabric care composition may be or may be provided as a solid or in a solid form. As used herein, the term or expression "solid" may exclude one or more of liquids, gels, creams and pastes, or the like, or any combination thereof. As used herein, the term or expression "gel" may refer to a transparent or semi-transparent liquid having a viscosity of greater than about 2000 mPa at 25° C. and a shear rate of about 20 $sec^{-1}$. As used herein, the term or expression "cream" or "paste" may refer to an opaque liquid having a viscosity of greater than about 2000 mPa at 25° C. and a shear rate of about 20 $sec^{-1}$. Illustrative solids or solid forms of the fabric care composition may be or include, but are not limited to, beads, particles, powders, strips, films, fibers, or the like, or any combination thereof. In a preferred implementation, the fabric care composition is a solid film or sheet. As further described herein, in at least one implementation, the fabric care composition may be a solid film or sheet including one or more capsules filled with one or more fragrances. In an implementation including the capsules, the one or more fragrances contained therein may be or include a solid, a liquid, a cream, a paste, a gel, or the like, or any combination thereof.

The fabric care composition may be or include a water hydratable solid, such as a water hydratable film. As used herein, the term "water hydratable" may refer to a solid that dissolves, softens, solvates, disperses, or otherwise dissipates upon contact with water in an appreciable amount (e.g., an amount greater than 50%, greater than 60%, greater than 70%, greater than 80%, greater than 90%, or 100%) in a predetermined amount of time (e.g., less than 30 min, less than 20 min, less than 10 min, less than 5 min, less than 2 min, or less than 1 min). The water hydratable solid may include a homogenous mixture or matrix of one or more water soluble polymers, one or more starches, or combinations thereof. The homogenous mixture or matrix of the water hydratable solid may sufficiently entrain, suspend, disperse, or otherwise incorporate one or more of the capsules and/or one or more of the fragrances of the fabric care composition. As further described herein, the water hydratable solid or the homogenous mixture thereof of the fabric care composition may be contacted with water to thereby release the capsules and/or fragrances incorporated therein.

In at least one implementation, the fabric care composition may be free or substantially free of fibers. For example, the fabric care composition may be a solid film or sheet without fibers. In another example, the fabric care composition excludes fibers, such as fibers of conventional dryer sheets used in a drying cycle.

The water soluble polymers of the water hydratable solid or the fabric care composition may be or include, but is not limited to, cellulose ethers, methacrylates, polyvinylpyrollidone, or the like, or combinations thereof. For example, the water soluble polymer may include one or more cellulose ethers or cellulose polymers, selected from one or more of hydroxyalkyl cellulose polymers, such as hydroxypropyl methylcellulose (HPMC), hydroxyethylpropyl cellulose (HEPC), hydroxybutyl methyl cellulose (HBMC), hydroxypropyl cellulose, hydroxyethyl cellulose, methyl cellulose, carboxymethyl cellulose (CMC), or combinations thereof. In at least one implementation, the hydroxyalkyl cellulose polymer is a low viscosity hydroxylpropyl methyl cellulose polymer (HPMC). For example, the HPMC polymer may have a viscosity of from about 1 millipascal seconds (mPa·s) to about 100 mPa·s, as determined as a 2 wt % aqueous solution of the HPMC at 20° C. using a Ubbelohde tube viscometer. In a typical implementation, the HPMC has a viscosity of about 3 mPa·s to about 20 mPa·s at 20° C. In at least one implementation, the fabric care composition or the water hydratable solid thereof may include two or more hydroxyalkyl cellulose polymers having different molecular weights. In at least one implementation, the two or more hydroxyalkyl cellulose polymers may be or include, but is not limited to, METHOCEL™ E5 PREMIUM LV, which is commercially available from The Dow Chemical Company of Midland, MI, Hypromellose (hydroxypropyl methylcellulose, 50 mPa·s USP Substitution Type 2910), which is commercially available from VWR International Co. of Radnor, PA, or combinations thereof. METHOCEL™ E5 LV is a USP grade, low viscosity HPMC having 29.1% methoxyl groups and 9% hydroxyproxyl group substitutions. In a 2 wt % solution, the METHOCEL™ has a viscosity of 5.1 mPa·s at 20° C. as measured with a Ubbelohde tube viscometer.

The amount or concentration of any one or more of the water soluble polymers present in the fabric care composition or the water hydratable solid thereof may vary widely. The amount of any one or more of the water soluble polymers present in the fabric care composition or the water hydratable solid thereof may be greater than or equal to about 1 wt % and less than or equal to about 75 wt %, based on a total weight of the fabric care composition or the water hydratable solid. For example, the amount of any one or more of the water soluble polymers present in the fabric care composition or the water hydratable solid thereof may be from about 1 wt %, about 10 wt %, about 15 wt %, about 20 wt %, about 25 wt %, about 30 wt %, about 35 wt %, or about 40 wt %/o to about 45 wt %, about 50 wt %, about 55 wt %, about 60 wt %, about 65 wt %, about 70 wt %, or about 75 wt %, based on a total weight of the fabric care composition or the water hydratable solid. In another example, the amount of any one or more of the water soluble polymers present in the fabric care composition or the water hydratable solid thereof may be greater than 1 wt %, greater than 10 wt %, greater than 15 wt %, greater than 20 wt %, greater than 25 wt %, greater than 30 wt %, greater than 35 wt %, greater than 40 wt %, greater than 45 wt %, greater than 50 wt %, greater than 55 wt %, greater than 60 wt %, greater than 65 wt %, greater than 70 wt %, or greater than 75 wt %, based on a total weight of the fabric care composition or the water hydratable solid.

As discussed above, the water hydratable solid (e.g., water hydratable film) may include a homogenous mixture of the one or more water soluble polymers, one or more starches, or combinations thereof. The one or more starches may be or include but are not limited to, pregelatinized starches. For example, the one or more starches may be or include one or more water swellable, physically modified, pregelatinized, and/or gelatinized starches. The starches may be configured to increase the relative stiffness of the hydroxyalkyl methyl cellulose matrix or homogenous mixture. The starch of the water hydratable solid may be prepared by heating granular starch in the presence of water and optionally an organic solvent at a temperature not greater than 10° C. above the gelatinization temperature thereof. The starch obtained from the heating of the granular starch may then be dried to obtain the water swellable, physically modified and pregelatinized starch. In a typical implementation, the starch or pregelatinized starch is corn starch. In a more typical implementation, the pregelatinized starch is a pregelatinized, stabilized and cross-linked waxy maize starch.

The amount or concentration of the starches present in the fabric care composition or the water hydratable solid thereof may vary widely. The amount of the starches present in the fabric care composition or the water hydratable solid thereof may be from about 1 wt % to about 30 wt %, based on a total weight of the fabric care composition or the water hydratable solid. For example, the amount of the starches present in the fabric care composition or the water hydratable solid thereof may be from about 1 wt %, about 5 wt %, about 10 wt %, or about 15 wt % to about 20 wt %, about 25 wt %, or about 30 wt %, based on a total weight of the fabric care composition or the water hydratable solid. In a typical implementation, the amount of the starches present in the fabric care composition or the water hydratable solid thereof may about 9 wt %, more preferably about 9.4 wt %, based on a total weight of the fabric care composition or the water hydratable solid. In at least one implementation, a ratio of the water soluble polymer to starch may be from about 0.1:3 to about 3:0.1.

The fabric care composition may include one or more cationic polymers or cationic polyelectrolytes. The cationic polymers or cationic polyelectrolytes may be capable of or configured to facilitate the retention and/or deposition of the capsules on the fabrics or the fibers thereof. As used herein, the term or expression "cationic polymer" may refer to a polymer having a net cationic charge. As used herein, the term or expression "polymer" may refer to any one or more of homopolymer, copolymer, terpolymer, polymers including four or more different monomers, or combinations thereof. The one or more cationic polymers of the fabric care composition may be or include one or more polymers that are protonated at the pH of the intended use. The one or more cationic polymers may have a charge density of from about 0.001 milliequivalents per gram (mEq/g), about 0.01 mEq/g, about 0.1 mEq/g, or about 1 mEq/g to about 5 mEq/g, about 10 mEq/g, about 15 mEq/g, about 20 mEq/g, or about 25 mEq/g at the pH of the intended use of the fabric care composition. The pH of the intended use of the fabric care composition may be acidic, basic, or generally neutral. For example, the pH of the intended use of the fabric care composition may be of from about 2, about 3, about 4, about 5, about 6, or about 7 to about 8, about 9, about 10, or about 11.

In at least one implementation, the one or more cationic polymers may be or include, but are not limited to, one or more cationic polysaccharides, polyethylene imine, derivatives thereof, or combinations thereof. Illustrative cationic polymers may be or include, but are not limited to, poly(acrylamide-co-diallyldimethylammonium chloride), poly(acrylamide-methacrylamido propyl trimethylammonium chloride), poly(acrylamide-co-N,N-dimethyl aminoethyl acrylate) and its quaternized derivatives, poly(acrylamide-co-N,N-dimethyl aminoethyl methacrylate) and its quaternized derivative, poly(hydroxyethylacrylate-co-dimethyl aminoethyl methacrylate), poly(hydroxpropylacrylate-co-dimethyl aminoethyl methacrylate), poly(hydroxpropylacrylate-co-methacrylamido propyl trimethylammonium chloride), poly(acrylamide-co-diallyldimethylammonium chloride-co-acrylic acid), poly(acrylamide-methacrylamidopropyltrimethyl ammonium chloride-co-acrylic acid), poly(diallyldimethyl ammonium chloride), poly(vinylpyrrolidone-co-dimethylaminoethyl methacrylate), poly(ethyl methacrylate-co-quaternized dimethylaminoethyl methacrylate), poly(ethyl methacrylate-co-oleyl methacrylate-co-diethylaminoethyl methacrylate), poly(diallyldimethylammonium chloride-co-acrylic acid), poly(vinyl pyrrolidone-co-quaternized vinylimidazole), poly(acrylamide-co-Methacryloamidopropyl-pentamethyl-1,3-propylene-2-ol-ammonium dichloride), or combinations an mixtures thereof. Additional illustrative cationic polymers may be or include, but are not limited to, polyquats, such as Polyquaternium-1, Polyquaternium-2, Polyquaternium-4, Polyquaternium-5, Polyquaternium-6, Polyquaternium-7, Polyquaternium-8, Polyquaternium-9, Polyquaternium-10, Polyquaternium-11, Polyquaternium-12, Polyquaternium-13, Polyquaternium-14, Polyquaternium-15, Polyquaternium-16, Polyquaternium-17, Polyquaternium-18, Polyquaternium-19, Polyquaternium-20, Polyquaternium-22, Polyquaternium-24, Polyquaternium-27, Polyquaternium-28, Polyquaternium-29, Polyquaternium-30, Polyquaternium-31, Polyquaternium-32, Polyquaternium-33, Polyquaternium-34, Polyquaternium-35, Polyquaternium-36, Polyquaternium-37, Polyquaternium-39, Polyquaternium-42, Polyquaternium-43, Polyquaternium-44, or combinations thereof, as named under the International Nomenclature for Cosmetic Ingredients (INCI). In a preferred implementation, the one or more cationic polymers include a copolymer of acrylamide and a quaternium ammonium salt, diallyldimethylammonium chloride, or Polyquaternium-7.

The one or more cationic polymers may be present in the fabric care composition in an amount of from greater than 0 wt % to less than or equal to about 30 wt %, based on a total weight of the fabric care composition. For example, the fabric care composition may include the one or more cationic polymers in an amount of from about 0.01 wt %, about 0.1 wt %, about 0.5 wt %, about 1 wt %, about 2 wt %, about 5 wt %, or about 6 wt % to about 7 wt %, about 8 wt %, about 10 wt %, about 12 wt %, or about 15 wt %, based on a total weight of the fabric care composition. In another example, the fabric care composition may include the one or more cationic polymers in an amount of from about 1 wt %, about 5 wt %, about 10 wt %, or about 15 wt % to about 20 wt %, about 25 wt %, or about 30 wt %, based on a total weight of the fabric care composition. In at least one implementation, the amount of the one or more cationic polymers may be at least partially determined by an amount of one or more components of the fabric care composition. For example, the amount of the one or more cationic polymers may be at least partially determined by the amount of the capsules and/or the amount of the fragrances present in the fabric care composition. In at least one implementation, a weight ratio of the one or more cationic polymers to the capsules or the fragrances may be from about 0.1:1 to about 4:1, 0.2:1 to about 3:1, or about 0.3:1 to about 2:1.

The fabric care composition may include one or more fragrances or perfumes. As used herein, the term or expression "fragrance" or "perfume" may be used in its ordinary sense to refer to and include any water soluble or non-water soluble fragrant substance or mixture of substances including natural fragrances (i.e., obtained by extraction of flower, herb, blossom or plant), artificial fragrances (i.e., mixture of natural oils or oil constituents), synthetically produced odoriferous substances or fragrances, or combinations thereof.

The fabric care composition may include free fragrances, encapsulated fragrances, or a mixture thereof. For example, the fabric care composition may include one or more free fragrances dispersed throughout the fabric care composition, such as dispersed in the water hydratable solid (e.g., water hydratable film). In another example, the one or more fragrances may be encapsulated in capsules. For example, the fabric care composition may include capsules containing the fragrances, and the capsules may be dispersed throughout the fabric care composition or the water hydratable solid thereof.

The capsules may be capable of or configured to contain the one or more fragrances. The capsules may be fabricated from any suitable material or materials that are capable of or configured to encapsulate the one or more fragrances, and compatible with one or more of the remaining components of the fabric care composition. For example, the capsules may be fabricated from any suitable material or materials that are capable of or configured to encapsulate the one or more fragrances, and compatible with the water hydratable polymer. The capsules may also be fabricated from any suitable material that allows the release of the fragrance contained therein through diffusion of the fragrance through walls of the capsules, rupture of the capsules, or combinations thereof. For example, the capsules may be fabricated from any suitable material or materials that allow the diffusion of the fragrance through the walls, thereby providing fragrance delivery for at least 1 day, at least 2 days, at least 5 days, at least 15 days, at least 30 days, at least 60 days, at least 90 days, at least 120 days, or more. In another example, the capsules may be fabricated from any suitable material or materials that allow the fragrances to be release when the capsules are ruptured, thereby providing immediate release of the fragrances.

In at least one implementation, the capsules may include or be formed from one or more of polyurethane, polysiloxanes, polyurea, polyamide, polyimide, polyvinyl alcohol, polyanhydride, polyolefin, polysulfone, polysaccharide, protein, polylactide (PLA), polyglycolide (PGA), polyorthoester, polyphosphazene, silicone, lipid, modified cellulose, gums, polystyrene, polyesters, ethylene maleic anhydride copolymer, styrene maleic anhydride copolymer, ethylene vinyl acetate copolymer, lactide glycolide copolymer, or the like, or combinations thereof. In at least one implementation, the capsules may include or be formed from urea-formaldehyde, melamine-formaldehyde phenolic-formaldehyde, urea-glutaraldehyde, melamine-glutaraldehyde, phenolic-glutaraldehyde, polyurea (isocyanate-based), polyurethane, acrylate-based hydrogels, polyurea/polyurethane-acrylic hybrid materials, polyamide based materials, polyester-based materials, epoxy-based cross-linkers, silk fibroin capsules, silica and silica-derived materials, or the like, or combinations thereof. In at least one implementation, the selection of the materials used to form the capsules may be at least partially determined by the surface charge or desired surface charge of the capsules. For example, the materials used to form the capsules may provide a net cationic or net anionic charge on outer surfaces of the capsules, which may facilitate adhesion or attraction of the capsules to the fabric or the fibers thereof.

In a preferred implementation, the capsules include urea-formaldehyde capsules, melamine formaldehyde capsules, or combinations thereof. Urea-formaldehyde and melamine-formaldehyde pre-condensate capsule shell wall precursors may be prepared by reacting urea or melamine with formaldehyde where a mole ratio of melamine or urea to formaldehyde is from about 10:1 to about 1:6, preferably from about 1:2 to about 1:5. Methods for the formation of the melamine-formaldehyde and urea-formaldehyde capsules are provided in U.S. Pat. Nos. 3,516,846 and 6,261,483, and Lee, et al. (2002) *J. Microencapsulation* 19:559-569, the contents of which are incorporated herein by reference.

In at least one implementation, the fragrance containing capsules may be dispersed in the fabric care composition. For example, the capsules containing the fragrances may be dispersed in the water hydratable solid or film of the fabric care composition. The capsules may be nanoparticles having a diameter of from about 10 nm to about 100 nm. The capsules may also have a diameter greater than 100 nm. For example, the particle size of the capsules may be greater than 100 nm, greater than 1 μm and less than or equal to 200 μm. For example, the particle size of the capsules may be greater than 1 μm and less than or equal to 200 μm, less than or equal to 100 μm, less than or equal to 75 μm, less than or equal to 65 μm, less than or equal to 60 μm, less than or equal to 55 μm, less than or equal to 50 μm, less than or equal to 45 μm, or less than or equal to 10 μm. The capsules may have a mean particle size of from about 10 μm to about 150 μm. In at least one implementation, the capsules may be sized such that the fabric care composition is clear, transparent, or semi-transparent. In another example, the capsules may have a diameter and/or a mean particle size of from about 50 nm to about 1000 μm, about 1000 nm to about 500 μm, or about 1 μm to about 200 μm. It should be appreciated that the distribution of the diameters of the capsules may be narrow, broad, or multi-modal. It should further be appreciated that in a multi-modal distribution, the capsules may include two or more different types of capsules or capsules fabricated from different materials.

The amount or concentration of the capsules and/or the fragrances contained therein present in the fabric care composition may vary widely. In at least one implementation, the capsules and/or the fragrances contained therein may be present in the fabric care composition in an amount of from about 1 wt % to about 60 wt %, based on a total weight of the fabric care composition. For example, the capsules and/or the fragrances contained therein may be present in the fabric care composition in an amount of from about 1 wt %, about 5 wt %, about 10 wt %, about 15 wt %, about 20 wt %, about 25 wt %, or about 30 wt % to about 35 wt %, about 40 wt %, about 45 wt %, about 50 wt %, about 55 wt %, or about 60 wt %, based on a total weight of the fabric care composition. In at least one implementation, the capsules may be present in an amount that allows the fabric care composition to be at least partially transparent, clear, or semi-transparent.

In at least one implementation, the fabric care composition may include one or more surfactants or a surfactant system, which may be capable of or configured to facilitate mixing or contact between one or more components of the fabric care composition and/or provide an emulsifying property to the fabric care composition. Illustrative surfactants may be or include, but are not limited to, polypropylene glycol, materials containing propylene oxide groups, materials containing polyethylene oxide groups, polyoxyethylene-polyoxypropylene glycols, polysorbate 20 (TWEEN™ 20), POLOXAMER™ 124 (PLURONIC™ L44), polyethylene oxide-polypropylene oxide block copolymer having the formula (EO)x(PO)y(EO)z with x=11±3, z=11±3 and y=21±5, POLOXAMER™ L35, POLOXAMER™ L31, polyethylene glycol 55 (PEG-55), glycerin, diethylene glycol, CREMOPHOR™ polyoxyethyleneglyceroltriricinoleat, GLUCAM™ P-10 propylene glycol ether of methyl glucose with 10 polypropylene oxide units, PLURIOL™ E300 alkoxylates based on ethylene oxide and propylene oxide, sodium cumene sulfonate (SCS), sodium xylene sulfonate (SXS), GLUCAM™ P-20 propylene glycol ether of methyl glucose with 20 polypropylene oxide units, GLUCAM™ E-20 ethylene glycol ether of methyl glucose with 20 polyethylene oxide units, GLUCAM™ E-10 ethylene glycol ether of methyl glucose with 10 polyethylene oxide units, and short chain ethoxylated propoxylated alcohols such as PPG2-Buteth-3, PPG3-Buteth-5, or PPG5-Buteth-7. Illustrative surfactants or viscosity control agents may also be or include, but are not limited to, PLURONIC® L35, PLURONIC® L43, PLURONIC® L64, PLURONIC® L10, PLURONIC® L44, PLURONIC® L62, PLURONIC® 10R5, PLURONIC® 17R4, PLURONIC® L25R4, PLURONIC® P84, PLURONIC® P65, PLURONIC® P104, PLURONIC® P105, and the like, and combinations thereof, which are commercially available from BASF of Mount Olive, NJ In a typical implementation, the surfactant is or includes polysorbate 20 (TWEEN™ 20).

The surfactants may be or include anionic, nonionic, cationic, amphoteric surfactants, or combinations thereof. The anionic surfactants may be or include water-soluble salts of C8-20 alkyl sulfates, sulfonated monoglycerides of C8-20 fatty acids, sarcosinates, taurates, and the like. Illustrative anionic surfactants may be or include, but are not limited to, sodium lauryl sulfate, sodium cocoyl monoglyceride sulfonate, sodium lauryl sarcosinate, sodium lauryl isoethionate, sodium laureth carboxylate, and sodium dodecyl benzenesulfonate. The nonionic surfactants may be or include poloxamers, polyoxyethylene sorbitan esters, fatty alcohol ethoxylates, alkylphenol ethoxylates, tertiary amine oxides, tertiary phosphine oxides, dialkyl sulfoxides and the like. The amphoteric surfactants may be or include, but are not limited to, derivatives of C8-20 aliphatic secondary and tertiary amines having an anionic group such as carboxylate, sulfate, sulfonate, phosphate or phosphonate. In at least one example, the surfactant is cocamidopropyl betaine.

The amount of the surfactants present in the fabric care composition or a component (e.g., water hydratable solid) thereof may vary widely. In at least one implementation, the amount of the surfactant present in the fabric care composition or the component thereof may be from about 0.0 wt % to about 4.0 wt %, based on a total weight of the fabric care composition or the component thereof. For example, the amount of the surfactant present in the fabric care composition or the component thereof may be from about 0.0 wt %, about 0.2 wt %, about 0.4 wt %, about 0.6 wt %, about 0.8 wt %, about 1.0 wt %, about 1.2 wt %, about 1.4 wt %, about 1.6 wt %, about 1.8 wt %, or about 2.0 wt % to about 2.2 wt %, about 2.4 wt %, about 2.6 wt %, about 2.8 wt %, about 3.0 wt %, about 3.2 wt %, about 3.4 wt %, about 3.6 wt %, about 3.8 wt %, or about 4.0 wt %, based on a total weight of the fabric care composition or the component thereof.

In at least one implementation, the fabric care composition may include titanium dioxide and/or titanium dioxide coated mica (TIMIRON®). In another implementation, the fabric care composition may be free or substantially free of titanium dioxide and/or titanium dioxide coated mica (TIMIRON®). In at least one implementation, the fabric care composition may be free or substantially free of aminosilicates or aminosilicone.

The fabric care composition may include one or more water-soluble or water-dispersible solvents capable of or configured to act as a carrier for any one or more of the remaining components of the fabric care composition. Illustrative water-soluble or water-dispersible solvents may be or include, but are not limited to, water, C4 to C10 glycol ethers, C2 to C7 glycols, polyethers, glycerin, or the like, or combinations thereof. For example, the fabric care composition may include any one or more of water, propylene glycols, ethylene glycols, polyethylene glycols, glycerin, or the like, or combinations thereof.

The fabric care composition may include one or more preservatives. Illustrative preservative may include, but are not limited to, one or more organic acids, such as lactic acid, phosphonic acid, amino trimethyl phosphonic acid, isothiazolinones, a (OIT/MIT/CIT) isothiazolinone mixture, or the like, or combinations thereof. The one or more preservatives may be present in an amount greater than 0 wt % to less than 1 wt %, less than 0.5 wt %, or less than 0.2 wt %, based on a total weight of the fabric care composition.

In at least one implementation, the fabric care composition may also include other components commonly used in fabric care compositions in minor amounts (e.g., greater than 0 wt/u to less than 5 wt %) to enhance either the appearance or performance of the fabric care compositions. For example, the fabric care composition may include any one or more of thickeners, dyes or pigments, bluing agents, germicides, opacifying agents, or the like, or combinations thereof.

The fabric care composition disclosed herein, may provide fragrance release for a period of time relatively greater than convention liquid fabric care compositions. The fabric care composition disclosed herein, may also provide fragrance release for a period of time relatively greater than a similar fabric care composition without the cationic polymers (e.g., polyquats). In at least one implementation, the fabric care composition disclosed herein may provide relatively greater fragrance intensity and/or preference or liking for a period of at least 1 day, at least 7 days, at least 28 days, at least 30 days, at least 60 days, at least 90 days, at least 120 days, when the textiles are mechanically agitated (e.g., rubbed) and/or when the textiles are not mechanically agitated.

The fabric care composition disclosed herein may be utilized in varying consumer and personal care applications. For example, the fabric care composition disclosed herein may be utilized in or as any one or more of the following: a fabric conditioner, detergent, cleaner, personal care, hair care, sunscreen formulations, liquid makeup, or the like, or any combination thereof.

Methods

The present disclosure may provide a method for preparing the fabric care composition disclosed herein. As discussed above, the fabric care composition may be a solid fabric care composition. In at least one implementation, the solid fabric care composition may be in the form of a solid film or a film matrix containing capsules dispersed therein, where the capsules contain one or more fragrances. The solid film or film matrix may be prepared by mixing, combining, or otherwise contacting the one or more water soluble polymers, such as one or more hydroxyalkyl methyl cellulose polymers, the one or more starches, and/or a compatible solvent with one another to form a film forming composition. The hydroxyalkyl methyl cellulose polymers and the starches may be dissolved or dispersed in the compatible solvent. In at least one implementation, each of the starch and the hydroxyalkyl methyl cellulose polymer are mixed, dispersed, combined, or otherwise contacted with a compatible solvent, such as water, to form separate solutions before combining each of the solutions with one another. The hydroxyalkyl methyl cellulose may be mixed or combined with water and heated to aid the dispersion or solvation of the hydroxyalkyl methyl cellulose polymer in the water. In at least one implementation, an alkylene glycol, such as propylene glycol, and/or a surfactant or emulsifier, such as TWEEN® 80, may be added to the heated hydroxyalkyl methyl cellulose polymer solution prior to or after combining the hydroxyalkyl methyl cellulose polymer solution with the starch solution.

The method for preparing the fabric care composition may also include contacting the one or more cationic polymers and/or the capsules containing the fragrances with the film forming composition. In at least one implementation, the hydroxyalkyl methyl cellulose polymers, the starches, the compatible solvents, the cationic polymers, and/or the capsules containing the fragrances are combined with one another. In another implementation, the hydroxyalkyl methyl cellulose polymers, the starches, the cationic polymers, and/or the capsules containing the fragrances are combined with one another to form a mixture, such as a powdered or dry mixture, and the powdered or dry mixture is combined with the compatible solvent. In yet another implementation, the hydroxyalkyl methyl cellulose polymers, the starches, and/or the compatible solvent are combined with one another to form the film forming composition, and the cationic polymers and/or the capsules containing the fragrances are mixed, dispersed, or otherwise contacted in or throughout the film forming composition.

The method for preparing the fabric care composition may also include casting the film forming composition, including the cationic polymers and/or the capsules containing the fragrances dispersed therein, on a releasable carrier or substrate and drying the film forming composition to form a solid fabric care composition. In at least one implementation, the film forming composition including the cationic polymers and/or the capsules containing the fragrances may be cast as a film or a sheet. The substrate may have a surface tension that allows the film forming composition to coat or spread evenly without forming a destructive bond between the film and the substrate. Illustrative substrates may be or include, but are not limited to, glass, stainless steel, TEFLON®, polyethylene-impregnated paper, or the like. In at least one implementation, the film forming composition may be dried with heat. For example, the film forming composition may be dried in a drying oven, drying terminal, vacuum drier, hot plate, or any other suitable drying system/equipment that does not adversely affect the components of the fabric care composition.

A thickness of the film formed may vary widely. In at least one implementation, the film may have a thickness greater than or equal to about 10 μm and less than or equal to about 60 μm. After casting the film forming composition to prepare the fabric care composition as a sheet or film, the film of the fabric care composition may be shaped or cut into unitized dozes or separate unit doses. As used herein, the term or expression "unit dose" or "unitized dose" may refer to an amount of the fabric care product or the fabric care composition thereof suitable for a single use. For example, the amount of the fabric care product or the fabric care composition thereof suitable to treat one load of laundry or multiple loads of laundry. In at least one implementation, the unit dose of the fabric care product or the fabric care composition thereof may be from about 1 g to about 25 g per load of laundry.

In at least one implementation, the fabric care product or the fabric care composition thereof may include a protective barrier overcoat configured to increase a relative stability of the film. For example, prior to shaping or cutting the film, the film may be coated with a protective barrier overcoat, such as a food grade shellack or an ethyl cellulose, to increase the relative stability of the flakes formed from the film. It should be appreciated that any protective barrier overcoat may be utilized that is capable of or configured to provide increased stability of the film during transport and prior to use. It should also be appreciated that the protective barrier overcoat may be broken away or removed during use; for example, via friction or dissolution during laundering.

The present disclosure may also provide a method for delivering increased fragrance to textiles (e.g., clothes) during a washing cycle. The present disclosure may also provide a method for delivering fragrance from the textiles for an extended period of time (e.g., greater than 30 days, greater than 60 days, greater than 90 days, etc.). The present disclosure may further provide a method for delivering fragrance from the textiles at an intensity relatively greater than that delivered from a similar solid fabric care composition not including the cationic polymers. The present disclosure may further provide a method for delivering fragrance from the textiles at an intensity relatively greater than that delivered from a conventional liquid fabric care composition (e.g., liquid fabric conditioner). The present disclosure may also provide a method for softening the textiles.

The method may include laundering the textiles with the fabric care composition in a washing cycle. The method may also include adding a conventional detergent to the laundry during the washing cycle. The method may also include dissolving or hydrating the water hydratable solid film of the fabric care composition during the washing cycle to thereby release the capsules contained therein. The method may also include dispersing the capsules in the washing cycle and/or depositing at least a portion of the capsules on the textiles. The method may include facilitating the deposition of the capsules on the textiles with the one or more cationic polymers. The method may also include drying the textiles. Drying the textiles may include line-drying and/or machine drying the textiles. The method may also include diffusing at least a portion of the fragrances contained in the capsules through walls of the capsules to release at least a portion of the fragrances contained therein. The method may also include mechanically agitating the textiles and/or the capsules to thereby rupture the walls of the capsules to release the fragrances contained therein. Mechanically agitating the textiles may include rubbing the textiles with one another. The method may not include or may exclude adding the fabric care composition to a drying cycle of the laundry.

EXAMPLES

The examples and other implementations described herein are exemplary and not intended to be limiting in describing the full scope of compositions and methods of this disclosure. Equivalent changes, modifications and variations of specific implementations, materials, compositions and methods may be made within the scope of the present disclosure, with substantially similar results.

Example 1

The efficacy for delivering fragrance on laundered fabrics or textiles from a control film composition (1) and a test film composition (2) was evaluated. Each of the control (1) and test (2) film compositions were prepared with melamine formaldehyde capsules containing or encapsulating a fragrance.

The capsules contained the fragrance in an amount of about 28 weight % based on a total weight of the capsules. The control (1) and test (2) film compositions were prepared by combining the ingredients/components according to Table 1 to prepare a film forming composition, and subsequently casting the film forming composition into the film or sheets. It should be noted that the control (1) included relatively more fragrance than the test (2) composition.

TABLE 1

Film Compositions of Control (1) and Test (2)

| INGREDIENT/COMPONENT | CONTROL (1) (% weight) | TEST (2) (% weight) |
|---|---|---|
| Hydroxypropyl Methylcellulose (50 mPas) | 10.17 | 9.38 |
| Hydroxypropyl Methylcellulose (METHOCEL E5 ®) | 33.90 | 31.25 |
| Melamine-Formaldehyde Encapsulated Fragrance | 37.30 | 34.37 |
| Polyquaternium (e.g. Polyquaternium-7)) | 0.00 | 7.81 |
| Propylene Glycol | 5.08 | 4.69 |
| Polysorbate 80 | 1.69 | 1.56 |
| Starch | 10.17 | 9.38 |
| Excipients | 1.69 | 1.56 |
| Total | 100.0 | 100.0 |

To evaluate the efficacy of fragrance delivery, each of the control (1) and test (2) film compositions was loaded in a respective washing machine with 20 bath towels, 150 grams of a commercial detergent, and three kilograms (kg) of ballast. The control (1) and test (2) film compositions were then subjected to a full washing cycle and line dried in a controlled laboratory environment.

An Expert Sensory Panel of 20 expert panelists then evaluated each of the bath towels. Each of the expert panelists assessed each of the bath towels treated with the control (1) and test (2) film compositions using a standardized methodology and a 1-10 point assessment scale. The 1-10 point assessment scale was utilized for scoring/evaluating an intensity of the fragrance, where '1' represented the lowest value (i.e., no or low fragrance) and '10' represented the highest value (i.e., high fragrance). The 1-10 point scale was also utilized for scoring/evaluating a liking or preference for the fragrance, where '1' represented the lowest value (i.e., no or low preference) and '10' represented the highest value (i.e., high preference). Each of the bath towels were evaluated before rubbing and after rubbing the towels together by hand. The results of the evaluation by the Expert Sensory Panel are summarized in Tables 2 and 3.

TABLE 2

Fragrance Intensity of Control (1) and Test (2) Film Compositions

| Day | CONTROL (1) | TEST (2) |
|---|---|---|
| UNRUBBED | | |
| 0 (Wet Day) | 5.9 | 6.6 |
| 1 | 3.6 | 6.4 |
| 7 | 3.9 | 7.0 |
| 28 | 4.3 | 6.7 |
| RUBBED | | |
| 1 | 4.9 | 8.4 |
| 7 | 5.3 | 8.4 |
| 28 | 6.0 | 8.5 |

TABLE 3

Fragrance Liking/Preference of Control (1) and Test (2) Film Compositions

| Day | CONTROL (1) | TEST (2) |
|---|---|---|
| UNRUBBED | | |
| 0 (Wet Day) | 6.2 | 6.4 |
| 1 | 5.0 | 6.2 |
| 7 | 5.4 | 6.5 |
| 28 | 5.5 | 7.1 |
| RUBBED | | |
| 1 | 6.1 | 6.7 |
| 7 | 5.6 | 6.8 |
| 28 | 6.3 | 7.7 |

As demonstrated in Table 2, the test (2) film compositions surprisingly and unexpectedly exhibited significantly greater fragrance intensity as compared to the negative control (1) film composition. The significant greater fragrance intensity is made further surprising and unexpected since the test composition contained a relatively lower amount of the encapsulated fragrance than the negative control (34.37 wt % vs. 37.30 wt %), as indicated in Table 1. As demonstrated in Table 3, preference or liking of the fragrance followed similar trends with the fragrance intensity illustrated in Table 2 throughout the 28 days.

Example 2

The control (1) and test (2) film compositions prepared in Example 1 were further evaluated via solid phase microextraction gas chromatography-mass spectrometry (SPME-GC-MS) analysis to evaluate the release of volatile fragrance. Particularly, 2"×0.5" pieces of each of the towels washed with each of the control (1) and test (2) film compositions were evaluated via SPME-GC-MS. For the rubbed samples, each of the 2"×0.5" pieces were rubbed five times before placing into vials for GC/MS. The towels were tested 28 days after the initial washing, as described above. The specific SPME method utilized was GC/MS 24 7890B/5977A (SN #CN15123180/US1512M418). The parameters of the SPME-GC-MS analysis are as follows: 100 um red PDMS SPME fiber, 50 C incubation, 10 min; 30 to 1 split ratio; Oven: 50° C. (1 min), Rate 5° C./min, 200° C., 5 min; 5° C./min, 220° C., 1 min, 41 min runtime. The results of the SPME analysis are summarized in Table 4.

TABLE 4

Total Area Count of Control (1) and Test (2) Film Compositions via SPME Analysis

| Condition | CONTROL (1) | TEST (2) |
|---|---|---|
| Unrubbed | 29,187 | 615,022 |
| Rubbed | 642,131 | 1,946,295 |

As illustrated in Table 4, the test (2) film composition released more volatile fragrance than the negative control (1) film compositions upon rubbing the towels after 28 days. The SPME further supports the longevity of fragrance delivery from the test (2) film compositions, which included the cationic polymer, namely, PQ-7.

Example 3

The test (2) film composition prepared in Example 1 was further evaluated in comparison to a control (3) liquid composition. The control (3) liquid composition included a commercial liquid fabric conditioner, namely, Suavitel Fresca Primavera. To evaluate the efficacy of fragrance delivery, each of the test (2) film composition and the control (3) liquid composition was loaded in a respective washing machine with 20 bath towels, 150 grams of a commercial detergent, and three kilograms (kg) of ballast. The test (2) film composition and the control (3) liquid composition were then subjected to a full washing cycle and line dried in a controlled laboratory environment.

An Expert Sensory Panel of 20 expert panelists then evaluated each of the bath towels. Each of the expert panelists assessed each of the bath towels treated with the test (2) film composition and the control (3) liquid composition using a standardized methodology and a 1-10 point assessment scale. The 1-10 point assessment scale was utilized for scoring/evaluating an intensity of the fragrance and a liking or preference of the fragrance, as discussed above. The 1-10 point scale was also utilized for scoring/evaluating softness of the towels after treatment with each of the test (2) film composition and the control (3) liquid composition, where '1' represented the lowest value (i.e., coarse, rough, etc.) and '10' represented the highest value (i.e., softest). The results are summarized in Tables 5-7.

TABLE 5

Fragrance Intensity of Test (2) Film Composition and Control (3) Liquid Composition

| Day | TEST (2) | CONTROL (3) |
|---|---|---|
| UNRUBBED | | |
| 0 (Wet Day) | 6.4 | 6.9 |
| 1 | 5.9 | 5.1 |
| 7 | 4.7 | 4.4 |
| 28 | 5.4 | 3.3 |
| RUBBED | | |
| 1 | 7.2 | 5.7 |
| 7 | 7.5 | 5.6 |
| 28 | 7.0 | 4.1 |

As indicated in Table 5, the fragrance intensity of the test (2) film compositions was relatively greater than the control (3) liquid compositions, which utilized a liquid fabric conditioner, throughout the 28 days. On day 0 or immediately after washing, the control (3) liquid composition did exhibit a slightly greater or parity fragrance intensity, but thereafter, the test (2) film compositions demonstrated significantly greater fragrance intensity.

TABLE 6

Fragrance Liking/Preference of Test (2) Film Composition and Control (3) Liquid Composition

| Day | TEST (2) | CONTROL (3) |
|---|---|---|
| | UNRUBBED | |
| 0 (Wet Day) | 6.2 | 7.3 |
| 1 | 6.2 | 5.9 |
| 7 | 5.3 | 5.0 |
| 28 | 6.2 | 4.5 |
| | RUBBED | |
| 1 | 6.3 | 6.2 |
| 7 | 6.2 | 6.1 |
| 28 | 5.9 | 5.2 |

As indicated in Table 6, on day 0 or immediately after washing, the control (3) liquid composition exhibited a greater fragrance preference, which may be attributed to the relatively greater fragrance intensity (see Table 5). During drying, however, the towels treated with the test (2) film compositions exhibited either parity or significantly greater fragrance preference as compared to the control (3) liquid composition.

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A fabric care composition, comprising:

a water hydratable solid, the water hydratable solid comprising:

one or more water soluble polymers;

one or more cationic polymers; and one or more starches; and capsules dispersed in the water hydratable solid, wherein the capsules comprise a fragrance, wherein the fragrance is encapsulated in the capsules, wherein the one or more of the water-soluble polymers comprise a hydroxyalkyl cellulose polymer present in an amount of from 35 wt. % to 45 wt. % based on a total weight of the fabric care composition;

wherein the hydroxyalkyl cellulose polymer is hydroxypropyl methylcellulose present in an amount of about 40.63 wt. %, the one or more cationic polymers are a copolymer of acrylamide and diallyldimethylammonium chloride present in an amount of about 7.81 wt. %, all based on a total weight of the fabric care composition; and wherein the term "about" in conjunction with a numeral refers to values that are within +5% of given values above.

2. The fabric care composition of claim 1, wherein the one or more hydroxyalkyl cellulose polymers comprise hydroxypropyl methylcellulose.

3. The fabric care composition of claim 1, wherein the one or more starches comprises corn starch.

4. The fabric care composition of claim 1, wherein the one or more cationic polymers comprises a polyquat.

5. The fabric care composition of claim 1, wherein the one or more cationic polymers is selected from the group consisting of poly(acrylamide-co-diallyldimethylammonium chloride), poly(acrylamide-methacrylamidopropyltrimethyl ammonium chloride), poly(acrylamide-co-N,N-dimethyl aminoethyl acrylate) and its quaternized derivatives, poly (acrylamide-co-N,N-dimethyl aminoethyl methacrylate) and its quaternized derivative, poly(hydroxyethylacrylate-co-dimethyl aminoethyl methacrylate), poly(hydroxpropylacrylate-co-dimethyl aminoethyl methacrylate), poly(hydroxpropylacrylate-co-methacrylamidopropyltrimethyl ammonium chloride), poly(acrylamide-co-diallyldimethylammonium chloride-co-acrylic acid), poly(acrylamide-methacrylamidopropyltrimethyl ammonium chloride-co-acrylic acid), poly(diallyldimethyl ammonium chloride), poly(vinylpyrrolidone-co-dimethylaminoethyl methacrylate), poly(ethyl methacrylate-co-quaternized dimethylaminoethyl methacrylate), poly(ethyl methacrylate-co-oleyl methacrylate-co-diethylaminoethyl methacrylate), poly(diallyldimethylammonium chloride-co-acrylic acid), poly(vinyl pyrrolidone-co-quaternized vinyl imidazole), poly(acrylamide-co-Methacryloamidopropyl-pentamethyl-1,3-propylene-2-ol-ammonium dichloride), and combinations thereof.

6. The fabric care composition of claim 1, wherein the one or more cationic polymers comprises a copolymer of acrylamide and a quaternium ammonium salt, wherein the quaternium ammonium salt is diallyldimethylammonium chloride.

7. The fabric care composition of claim 1, wherein the fabric care composition is a solid, optionally, a solid film.

8. The fabric care composition of claim 1, wherein the fabric care composition is free or substantially free of fibers.

9. A method for preparing the fabric care composition of claim 1, the method comprising:

contacting the one or more water soluble polymers, the one or more cationic polymers, and the one or more starches with a suitable solvent to prepare a film forming composition;

dispersing the capsules in the film forming composition; and removing the solvent from the film forming composition to thereby prepare a solid fabric care composition.

10. The method of claim 9, wherein removing the solvent from the film forming composition comprises:

casting the film forming composition on a substrate; and evaporating the solvent from the film forming composition, optionally, evaporating the solvent with heat.

11. The method of claim 9, further comprising contacting a surfactant with the film forming composition.

12. A method for delivering increased fragrance intensity to a fabric, the method comprising washing the fabric with the fabric care composition of claim 1, optionally, washing the fabric with the fabric care composition and a detergent.

13. The method of claim 12, further comprising depositing the capsules of the fabric care composition on the fabric.

14. The fabric care composition of claim 1 for use in delivering increased fragrance intensity to a fabric, comprising a step of washing the fabric with the fabric care composition of claim 1.

15. The fabric care composition of claim 1, wherein the fragrance is melamine-formaldehyde encapsulated fragrance present in an amount of about 34.37 wt. %, the one or more hydroxyalkyl cellulose polymers are hydroxypropyl methylcellulose present in an amount of about 40.63 wt. %, all based on a total weight of the fabric care composition; and wherein the term "about" in conjunction with a numeral refers to values that are within ±5% of given values above.

16. The fabric care composition of claim 1, further comprising propylene glycol present in an amount of about 4.69 wt. % and polysorbate 80 present in an amount of about 1.56 wt. %, all based on a total weight of the fabric care composition; and wherein the term "about" in conjunction with a numeral refers to values that are within +5% of given values above.

17. The fabric care composition of claim 1, further comprising starch present in an amount of about 9.38 wt. % and excipients present in an amount of about 1.56 wt. %, all based on a total weight of the fabric care composition; and wherein the term "about" in conjunction with a numeral refers to values that are within ±5% of given values above.

* * * * *